No. 42,843. PATENTED MAY 24, 1864.
J. ELLIS.
MICROSCOPE.
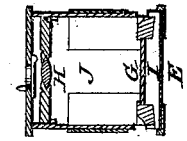
Fig. 9.
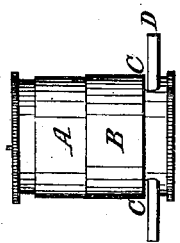
Fig. 5.
Fig. 3.
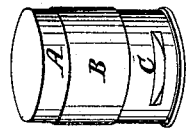
Fig. 8.
Fig. 2.
Fig. 4.
Fig. 7.
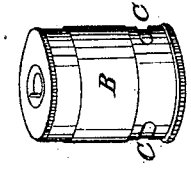
Fig. 6.
Fig. 1.
Witnesses.
J. Holmes.
W.H. Burridge
Inventor.
John Ellis.

UNITED STATES PATENT OFFICE.

JOHN ELLIS, OF NEW YORK, N. Y.

IMPROVEMENT IN MICROSCOPES.

Specification forming part of Letters Patent No. 42,843, dated May 24, 1864.

*To all whom it may concern:*

Be it known that I, JOHN ELLIS, of New York, in the county of New York and State of New York, have invented new and useful Improvements in Microscopes; and I do hereby declare that the following is a full and complete description of the construction and operation of the same, reference being had to the accompanying drawings, making part of this specification, in which—

Figures 1, 2, and 3 are different views of the stand for the examination of opaque objects. Fig. 4 is a view of an adjustable band for securing live insects for examination. Fig. 5 is a side view of the microscope, with a slider in place for viewing set objects. Fig. 6 is a perspective view of the microscope. Fig. 7 is a perspective view of the eye-piece, showing the upper section of the chamber for confining live insects; and Fig. 8 is a view of the outer tube, with the lower section of the chamber.

Like letters refer to like parts.

My invention relates to such a construction that a chamber is formed in which objects may be confined for examination, or by removing the inner section of the instrument and placing it upon the porcelain stand opaque objects may be readily viewed.

In the accompanying drawings, A represents the outer case of the instrument. This part is shown detached in Fig. 8, with an adjustable sliding band, used for closing the apertures into the chamber, as hereinafter described. In the lower end of this outer case I make two openings—one upon each side—as seen at C C in Figs. 5, 6, and 8, for the purpose of introducing a slider, D, containing set objects. The adjustable band B is shoved down, so as to close these openings when live objects are to be examined.

The lower end of the outer case is set with a disk of plane glass, E, Fig. 9, which forms the outer wall of the chamber in which insects are confined for examination.

The inner case, F, Fig. 7, has its lower end also provided with a disk of plane glass, as seen at G, which is set a little above the lower end, so as to allow a space of about one-tenth of an inch between the plates E and G when the inner case is down. The upper end of the inner case carries the magnifying-lens H, whose focus should be within the chamber I, between the glass plates E and G, so that it can be adjusted to any part of the chamber for the examination of objects. The walls of the inner case, F, are removed upon each side, as seen in Fig. 7, leaving broad bars J upon opposite sides to support the setting of the lens at the top. When the slider is used, it passes between the bars J J. The inner case fits accurately the outside case, and can be drawn entirely out at pleasure. The lens, as is usual in such instruments, has its upper surface protected from injury by a disk or slider in the upper wall of the eye-piece.

The manner of using this instrument is as follows: For objects which are set upon a slider the band B is shoved up, so as to admit the slider below it, and after the slider is introduced it occupies the position of the chamber I. The band B can be shoved down to hold the slider steady. With the lens suitably adjusted the instrument is fitted for use with transmitted light.

If it is desired to examine a live insect or like object which requires confinement, the inner case is first entirely removed, and the band B shoved close down so as to cover the openings C. The insect or other object is then placed in the outer case, which is closed at the bottom by the glass E, and the inner case, F, introduced, and by shoving down the inner case the insect becomes inclosed in the chamber I, and can be conveniently examined upon either side, for the chamber is too narrow to allow an insect like a fly or bee to turn over in the chamber. This arrangement is more particularly adapted to such objects as can be examined by transmitted light.

For the examination of opaque objects I provide the porcelain stands shown in Figs. 1, 2, and 3. These may be made of any hard white substance, but the material I have named is probably the most economical. Upon one side of the stand, as shown at K, Figs. 1 and 3, I form a slight depression, upon which a thin opaque object can be placed for examination. The inner case of the microscope F is now withdrawn and placed over the object to be examined. The light falls upon the object through the openings between the bars J J. Upon the opposite side of the stand I make a depression, L, which is of less diameter and about one-twentieth ($\frac{1}{20}$) of an inch deep, which forms a chamber or cell when the case F is caused to rest upon it for the examination of larger opaque objects.

It is important that the stand for the examination of objects by reflected light should be made of some white material, for a much better view can be thus obtained.

What I claim as my improvement, and desire to secure by Letters Patent, is—

1. The chamber I, formed by means of the glass E in the outer case and the glass G in the inner case, arranged and operating as specified.

2. The band B, in combination with the openings C C, for the purpose herein set forth.

JOHN ELLIS.

Witnesses:
P. JAMES GAGE,
S. C. CALDWELL.